US008545305B2

(12) United States Patent
Ross et al.

(10) Patent No.: US 8,545,305 B2
(45) Date of Patent: Oct. 1, 2013

(54) DEVICES, SYSTEMS, AND METHODS FOR DYNAMICALLY SIMULATING A COMPONENT OF A WAGERING GAME

(75) Inventors: Kenneth M. Ross, Chicago, IL (US); Emilio D. Perez, Chicago, IL (US); Norma C. Rodriguez, Cicero, IL (US); Sean E. Hayes, Arlington Heights, IL (US); Vito M. Caporusso, Downers Grove, IL (US)

(73) Assignee: WMS Gaming Inc., Waukegan, IL (US)

(*) Notice: Subject to any disclaimer, the term of this patent is extended or adjusted under 35 U.S.C. 154(b) by 281 days.

(21) Appl. No.: 12/824,720

(22) Filed: Jun. 28, 2010

(65) Prior Publication Data

US 2011/0319152 A1 Dec. 29, 2011

(51) Int. Cl.

| | |
|---|---|
| ***A63F 9/00*** | (2006.01) |
| *F21V 7/04* | (2006.01) |
| *G02F 1/1335* | (2006.01) |
| *G09G 3/36* | (2006.01) |

(52) U.S. Cl.

USPC ................... 463/20; 463/30; 463/31; 463/32; 362/600; 362/601; 362/610; 362/616; 349/61; 349/62; 349/65; 349/71; 349/159; 345/102; 345/176; 345/653

(58) Field of Classification Search

USPC ................... 463/20, 30–32; 345/46, 48, 102, 345/176, 653; 349/61–62, 64–65, 68–69, 349/71, 112, 159; 362/600, 601, 610, 616

See application file for complete search history.

(56) References Cited

U.S. PATENT DOCUMENTS

| | | | | | |
|---|---|---|---|---|---|
| 1,167,653 | A | | 1/1916 | Nielsen | |
| 4,306,768 | A | * | 12/1981 | Egging | 359/630 |
| 4,885,663 | A | | 12/1989 | Parker | |
| 4,907,132 | A | | 3/1990 | Parker | |
| 5,005,108 | A | | 4/1991 | Pristash et al. | |
| 5,042,900 | A | | 8/1991 | Parker | |
| 5,513,851 | A | | 5/1996 | Harris | |
| 5,568,964 | A | | 10/1996 | Parker et al. | |
| 5,580,055 | A | * | 12/1996 | Hagiwara | 273/143 R |
| 5,673,128 | A | * | 9/1997 | Ohta et al. | 349/62 |
| 5,732,948 | A | | 3/1998 | Yoseloff | |
| 5,771,321 | A | * | 6/1998 | Stern | 385/31 |
| RE35,864 | E | | 7/1998 | Weingardt | |
| 5,806,847 | A | | 9/1998 | White et al. | |
| 5,924,926 | A | | 7/1999 | Brown | |
| 5,961,119 | A | | 10/1999 | Brown | |
| 6,062,563 | A | | 5/2000 | De Keller | |
| 6,079,838 | A | | 6/2000 | Parker et al. | |

(Continued)

*Primary Examiner* — Seng H Lim

(74) *Attorney, Agent, or Firm* — Nixon Peabody LLP

(57) ABSTRACT

Gaming devices, gaming systems, methods of conducting a wagering game, and computer programs for initiating a wagering game are presented herein. A gaming device is presented that includes a wager input device for receiving wagers from players to play a wagering game, and a display for displaying outcomes of the wagering game. The gaming device also includes a multi-layer composite lighting assembly with a first light-emitting layer, a second light-emitting layer, and a spacer. The first light-emitting layer emits light of a first color in a first direction, whereas the second light-emitting layer emits light of a second color in a second direction. The spacer, which is interposed between the first and second light-emitting layers, diffuses and focuses light emitted by the second light-emitting layer through the light emitted by the first light-emitting layer to thereby create a three-dimensional simulation of a component of the wagering game.

26 Claims, 10 Drawing Sheets

(56) References Cited

U.S. PATENT DOCUMENTS

| | | | | |
|---|---|---|---|---|
| 6,120,377 | A | 9/2000 | McGinnis, Sr. et al. | |
| 6,123,335 | A | 9/2000 | Adkins | |
| 6,147,934 | A * | 11/2000 | Arikawa et al. | 368/84 |
| 6,158,867 | A | 12/2000 | Parker et al. | |
| 6,213,876 | B1 | 4/2001 | Moore, Jr. | |
| 6,234,482 | B1 | 5/2001 | Henderson | |
| 6,270,411 | B1 | 8/2001 | Gura et al. | |
| 6,273,423 | B1 | 8/2001 | Promutico | |
| 6,286,834 | B1 | 9/2001 | Caputo | |
| 6,336,633 | B1 | 1/2002 | Webb | |
| 6,378,869 | B1 | 4/2002 | Hedge, Jr. et al. | |
| 6,508,469 | B2 | 1/2003 | Promutico | |
| 6,508,707 | B2 | 1/2003 | DeMar et al. | |
| 6,517,433 | B2 * | 2/2003 | Loose et al. | 463/20 |
| 6,695,703 | B1 * | 2/2004 | McGahn | 463/46 |
| 6,761,353 | B2 | 7/2004 | Berman et al. | |
| 6,776,413 | B2 | 8/2004 | Brown, III | |
| 6,854,732 | B2 | 2/2005 | Moody | |
| 6,861,600 | B1 | 3/2005 | Schulz et al. | |
| 6,874,925 | B2 | 4/2005 | Page et al. | |
| 6,896,264 | B1 | 5/2005 | Haber | |
| 6,900,851 | B2 * | 5/2005 | Morrison et al. | 349/25 |
| 6,910,783 | B2 | 6/2005 | Mezei et al. | |
| 7,137,884 | B2 | 11/2006 | Gilmore | |
| 7,195,560 | B2 | 3/2007 | DeMar et al. | |
| 7,223,005 | B2 * | 5/2007 | Lamb et al. | 362/615 |
| 7,234,697 | B2 * | 6/2007 | Okada | 273/143 R |
| 7,303,322 | B2 * | 12/2007 | Lamb et al. | 362/600 |
| 7,305,163 | B2 | 12/2007 | Williams | |
| 7,309,284 | B2 * | 12/2007 | Griswold et al. | 463/29 |
| 7,329,181 | B2 * | 2/2008 | Hoshino et al. | 463/20 |
| 7,492,084 | B2 * | 2/2009 | Park et al. | 313/492 |
| 7,658,504 | B2 * | 2/2010 | Moriyasu et al. | 362/97.3 |
| 7,762,704 | B2 * | 7/2010 | Brychell | 362/615 |
| 7,948,573 | B2 * | 5/2011 | Kang et al. | 349/58 |
| 7,972,206 | B2 * | 7/2011 | Okada | 463/16 |
| 8,123,609 | B2 * | 2/2012 | Sekiguchi et al. | 463/20 |
| 8,243,044 | B2 * | 8/2012 | Mackey et al. | 345/174 |
| 2001/0030805 | A1 * | 10/2001 | Sawaki et al. | 359/453 |
| 2001/0031658 | A1 * | 10/2001 | Ozaki et al. | 463/16 |
| 2001/0050667 | A1 * | 12/2001 | Kim et al. | 345/102 |
| 2002/0175466 | A1 * | 11/2002 | Loose et al. | 273/143 R |
| 2003/0214471 | A1 * | 11/2003 | Topelberg | 345/87 |
| 2004/0062025 | A1 * | 4/2004 | Satoh et al. | 362/27 |
| 2004/0147303 | A1 * | 7/2004 | Imura et al. | 463/16 |
| 2004/0150162 | A1 * | 8/2004 | Okada | 273/292 |
| 2004/0209668 | A1 * | 10/2004 | Okada | 463/20 |
| 2004/0209670 | A1 * | 10/2004 | Adachi et al. | 463/20 |
| 2004/0209682 | A1 * | 10/2004 | Okada | 463/31 |
| 2004/0214637 | A1 * | 10/2004 | Nonaka | 463/31 |
| 2004/0219965 | A1 * | 11/2004 | Okada | 463/16 |
| 2004/0224758 | A1 * | 11/2004 | Okada et al. | 463/31 |
| 2004/0229680 | A1 * | 11/2004 | Hoshino et al. | 463/20 |
| 2004/0266521 | A1 * | 12/2004 | Kojima | 463/20 |
| 2005/0014554 | A1 * | 1/2005 | Walker et al. | 463/20 |
| 2005/0032571 | A1 * | 2/2005 | Asonuma | 463/20 |
| 2005/0043092 | A1 * | 2/2005 | Gauselmann | 463/36 |
| 2005/0153775 | A1 * | 7/2005 | Griswold et al. | 463/30 |
| 2005/0192085 | A1 * | 9/2005 | Iwamoto | 463/20 |
| 2005/0282616 | A1 * | 12/2005 | Tanimura et al. | 463/20 |
| 2005/0282617 | A1 * | 12/2005 | Sekiguchi et al. | 463/20 |
| 2006/0073868 | A1 * | 4/2006 | Nordman | 463/16 |
| 2006/0166728 | A1 * | 7/2006 | Cornell et al. | 463/16 |
| 2006/0178205 | A1 * | 8/2006 | Bleich et al. | 463/22 |
| 2006/0189363 | A1 * | 8/2006 | Strom | 463/13 |
| 2006/0244879 | A1 * | 11/2006 | Yoon et al. | 349/71 |
| 2006/0291241 | A1 * | 12/2006 | Wojtowicz et al. | 362/604 |
| 2007/0019393 | A1 * | 1/2007 | Tsai | 362/26 |
| 2007/0021183 | A1 | 1/2007 | Fiden et al. | |
| 2007/0064171 | A1 * | 3/2007 | Moriyasu et al. | 349/61 |
| 2007/0091038 | A1 * | 4/2007 | Hagood et al. | 345/85 |
| 2007/0097296 | A1 * | 5/2007 | Li et al. | 349/114 |
| 2007/0202948 | A1 * | 8/2007 | Muir et al. | 463/31 |
| 2007/0259706 | A1 | 11/2007 | Anderson et al. | |
| 2008/0079865 | A1 * | 4/2008 | Kang et al. | 349/61 |
| 2008/0096655 | A1 * | 4/2008 | Rasmussen et al. | 463/31 |
| 2008/0167113 | A1 * | 7/2008 | Plowman | 463/20 |
| 2008/0194313 | A1 * | 8/2008 | Walker | 463/20 |
| 2009/0104969 | A1 * | 4/2009 | Paulsen et al. | 463/20 |
| 2009/0191947 | A1 * | 7/2009 | Stevens et al. | 463/20 |
| 2009/0191965 | A1 | 7/2009 | Dixon | |
| 2009/0219734 | A1 * | 9/2009 | Sawada et al. | 362/616 |
| 2009/0227357 | A1 * | 9/2009 | Rasmussen | 463/21 |
| 2009/0247270 | A1 * | 10/2009 | Shai-Hee | 463/20 |
| 2009/0305766 | A1 * | 12/2009 | Ashley et al. | 463/20 |
| 2010/0151931 | A1 * | 6/2010 | Jasper et al. | 463/20 |
| 2010/0231806 | A1 * | 9/2010 | Kuromizu | 348/725 |
| 2010/0234094 | A1 * | 9/2010 | Gagner et al. | 463/20 |
| 2011/0117992 | A1 * | 5/2011 | Nelson et al. | 463/20 |
| 2011/0261289 | A1 * | 10/2011 | Park et al. | 349/64 |
| 2012/0206321 | A1 * | 8/2012 | Lee et al. | 345/5 |
| 2012/0270648 | A1 * | 10/2012 | Rasmussen et al. | 463/30 |

* cited by examiner

DEVICES, SYSTEMS, AND METHODS FOR DYNAMICALLY SIMULATING A COMPONENT OF A WAGERING GAME

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming devices, gaming systems, and methods for playing wagering games. More particularly, the present invention relates to wagering games with simulated components and gaming devices and systems for playing a wagering game with simulated components.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators strive to employ the most entertaining and exciting machines, features, and enhancements available because such machines attract frequent and continuous play, increasing profitability to the operator.

One concept that has been employed to enhance player entertainment and achieve player loyalty is the use of progressive games. In the gaming industry, a “progressive” game involves collecting coin-in data from participating gaming device(s) (e.g., slot machines), contributing a percentage of that coin-in data to a progressive jackpot amount, and awarding that jackpot amount to a player upon the occurrence of a certain jackpot-won event. A jackpot-won event typically occurs when a “progressive winning position” is achieved at a participating gaming device. If the gaming device is a slot machine, a progressive winning position may, for example, correspond to alignment of progressive jackpot reel symbols along a certain payline. The initial progressive jackpot may be a predetermined minimum amount. That jackpot amount, however, progressively increases as players continue to play on participating gaming machines without winning the jackpot. Further, when several gaming machines are linked together such that several players at several gaming machines compete for the same jackpot, the jackpot progressively increases at a much faster rate, which leads to further player excitement. Typically, once the progressive jackpot is awarded, the jackpot amount is reset to the predetermined minimum amount.

Another concept that has been successfully employed to enhance the entertainment value of a game is that of a “secondary” or “bonus” game which may be played in conjunction with a “basic” game. The bonus game, which is entered upon the occurrence of a selected event or outcome of the basic game, may comprise any type of game, either similar to or completely different from the basic game. Such a bonus game produces a significantly higher level of player excitement than the basic game because it creates a greater expectation of winning than the basic game.

One type of bonus game that is commonly employed is a playing-board bonus game where elements of a well-recognized board game, such as Monopoly™, are incorporated into the bonus game. These games may have reel symbols that resemble the characters, tokens, game pieces, and so forth of the board game. Similarly, the cabinet, signage, and/or the graphics design of the gaming machine may be made to resemble the board layout of the board game. Furthermore, the rules that control certain aspects of game play may, in some cases, be modeled after the rules of the board game. It may be desirable to increase the excitement and entertainment value of these board game-themed wagering games in order to attract more players.

Another way to increase the entertainment value of a game is to enhance the display of the gaming machines. For gaming machines with video displays, improvements in video technology have enabled the display of richer and more colorful graphics. For gaming machines with mechanical displays, however, the enhancements early on were less technologically advanced. For example, some mechanical reel symbols were colored by backlighting the mechanical symbols with colored lighting elements. Sometimes the reel itself might contain electroluminescent elements that defined one or more reel symbols. Recent advances in transmissive display technology have made it possible to more easily modify the appearance of a mechanical display. The transmissive display is essentially a transparent video display that is superimposed over the mechanical display. The transmissive display can then be operated to display selected video images superimposed over the mechanical display.

Many gaming machines include a variety of visual attractions and displays, such as models, signs, and other forms of information. These items typically include fixed permanently-printed glass, video displays, fixed artwork, models, and marquees. In some gaming regions, industry regulations may require each gaming terminal to include top-box mounted lighting and signage that indicate, for example, the class of machine, when the machine is of out of funds, when the machine is malfunctioning, etc. New developments in visual attractions and displays, including those tied directly to play of the basic and bonus games, can further enhance player appeal and thus increase game play and player loyalty.

SUMMARY OF THE INVENTION

According to one aspect of the present invention, a gaming device for playing a wagering game is featured. The gaming device includes a wager input device for receiving wagers from players to play the wagering game, and a display for displaying outcomes of the wagering game. The gaming device also includes a multi-layer composite lighting assembly comprising a first light-emitting layer, a second light-emitting layer, and a spacer interposed between the first and second light-emitting layers. The first light emitting layer is configured to direct light of a first color in a first direction, whereas the second light-emitting layer is configured to emit light of a second color in a second direction. The second color is different from the first color, and the second direction is different from the first direction. The spacer is configured to receive the light emitted by the second light-emitting layer and focus the light through the light emitted by the first light-emitting layer to thereby create a three-dimensional simulation of a component of the wagering game According to another aspect of the invention, a gaming system is presented. The gaming system includes at least one wager input device configured to receive a wager from a player to play a wagering game, at least one display device configured to display an outcome of the wagering game, and at least one controller configured to execute the wagering game. The gaming system also includes a multi-layer composite lighting assembly comprising a first light-emitting layer, a second light-emitting layer, and a spacer interposed between and operatively attached to the first and second light-emitting layers. The first light-emitting layer is configured to direct light of a first color in a first direction, whereas the second light-emitting layer is configured to direct light of a second color in a second direction, the second color being different from the first color, and the second direction being different from the first direction. The spacer is configured to diffuse light emitted by the second light-emitting layer and focus light emitted by the second light-emitting layer through light emitted by the first light-emitting layer.

According to yet another aspect of the invention, a method for playing a wagering game on a gaming system is presented. The method comprises: initiating the wagering game using at least one processor; creating a three-dimensional simulation of a component of the wagering game; randomly determining, via at least one processor, an outcome of the wagering game; and causing at least one display device to display the wagering game outcome. Creating a three-dimensional simulation of a component of the wagering game includes: generating a surface of a first color via a first light-emitting layer of a multi-layer composite lighting assembly; emitting light of a second color distinct from the first color via a second light-emitting layer of the multi-layer composite lighting assembly; diffusing the light emitted by the second light-emitting layer via a spacer of the multi-layer composite lighting assembly; and focusing the light emitted by the second light-emitting layer through the surface generated by the first light-emitting layer via the spacer.

According to even yet another aspect of the invention, a computer readable storage media is encoded with instructions for directing a gaming system to perform the above methods.

The above summary of the invention is not intended to represent each embodiment or every aspect of the present invention. Rather, the summary merely provides an exemplification of some of the novel features featured herein. The above features and advantages, and other features and advantages of the present invention, will be readily apparent from the following detailed description of the embodiments and best modes for carrying out the present invention when taken in connection with the accompanying drawings and appended claims.

Figure 1A:
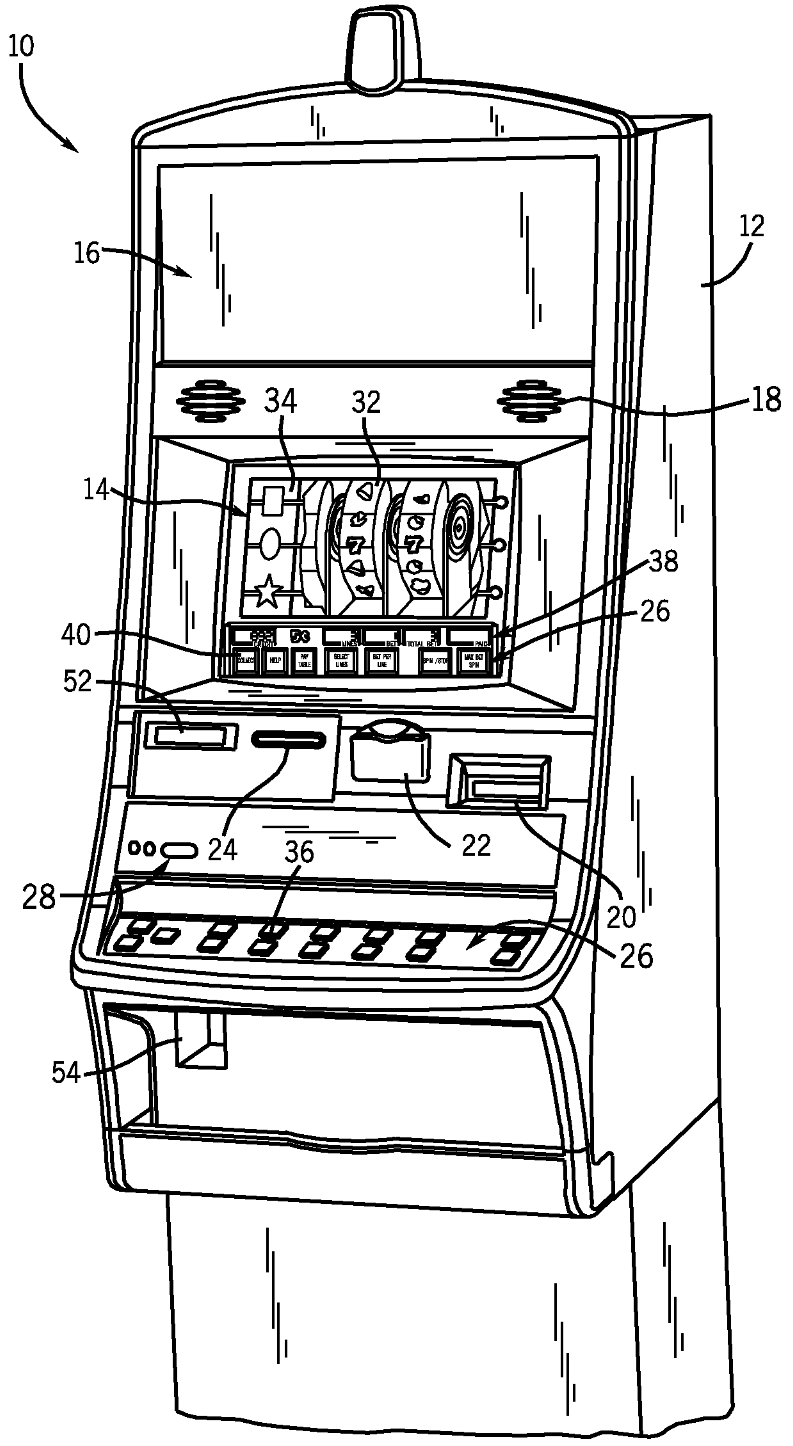
FIG. 1A is a perspective-view illustration of an exemplary free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE EXEMPLARY EMBODIMENTS

While this invention is susceptible of embodiment in many different forms, there is shown in the drawings and will herein be described in detail representative embodiments of the invention with the understanding that the present disclosure is to be considered as an exemplification of the various aspects and principles of the invention, and is not intended to limit the broad aspect of the invention to the embodiments illustrated. To that extent, elements and limitations that are disclosed, for example, in the Abstract, Summary of the Invention, and Detailed Description of the Embodiments sections, but not explicitly set forth in the claims, should not be incorporated into the claims, singly or collectively, by implication, inference or otherwise.

Referring to FIG. 1A, a perspective-view illustration of an exemplary gaming terminal 10 (also referred to herein as "wagering game machine" or "gaming machine") is shown in accordance with one embodiment of the present invention. The gaming terminal 10 of FIG. 1 may be used, for example, in traditional gaming establishments, such as casinos, and non-traditional gaming establishments, such as pools, hotels, restaurants, and airports. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, a mobile telecommunications device such as a mobile telephone or personal digital assistant (PDA), a counter-top or bar-top gaming terminal, or other personal electronic device, such as a portable television, MP3 player, entertainment device, etcetera. Finally, the drawings presented herein are not to scale and are provided purely for instructional purposes; as such, the individual and relative dimensions shown in the drawings are not to be considered limiting.

The gaming terminal 10 illustrated in FIG. 1A comprises a cabinet or housing 12. For output devices, this embodiment of the gaming terminal 10 includes, for example, a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1A includes, for example, a bill validator 20, a coin acceptor 22, one or more information readers 24, one or more player-input devices 26, and one or more player-accessible ports 28 (e.g., an audio output jack for headphones, a video headset jack, a wireless transmitter/receiver, etc.). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 include, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433, to Loose et al., entitled "Reel Spinning Slot Machine with Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1A. The primary display area 14 includes, in relation to many aspects of wagering games conducted on the gaming terminal 10, one or more paylines 30 (see FIG. 3) extending along a portion of the primary display area.

In the illustrated embodiment of FIG. 1A, the primary display area 14 comprises a plurality of mechanical reels 32 and a video display 34, such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1A may be replaced with a conventional glass or plastic panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1A, a mouse, a joy stick, a switch, a microphone, and/or a touch screen 38 mounted over the primary display area 14 and/or the secondary display area 16 and having one or more soft touch keys 40, as is also shown in FIG. 1A. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, to Giobbi, which is entitled "Portable Data Unit for Communicating with Gaming Machine over Wireless Link," and is incorporated herein by reference in its entirety. The noted account associated with cashless gaming is, in some aspects of the present concepts, stored at an external system

46 (see FIG. 2) as more fully disclosed in U.S. Pat. No. 6,280,328, to Holch et al., which is entitled "Cashless Computerized Video Game System and Method," and is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 1B:
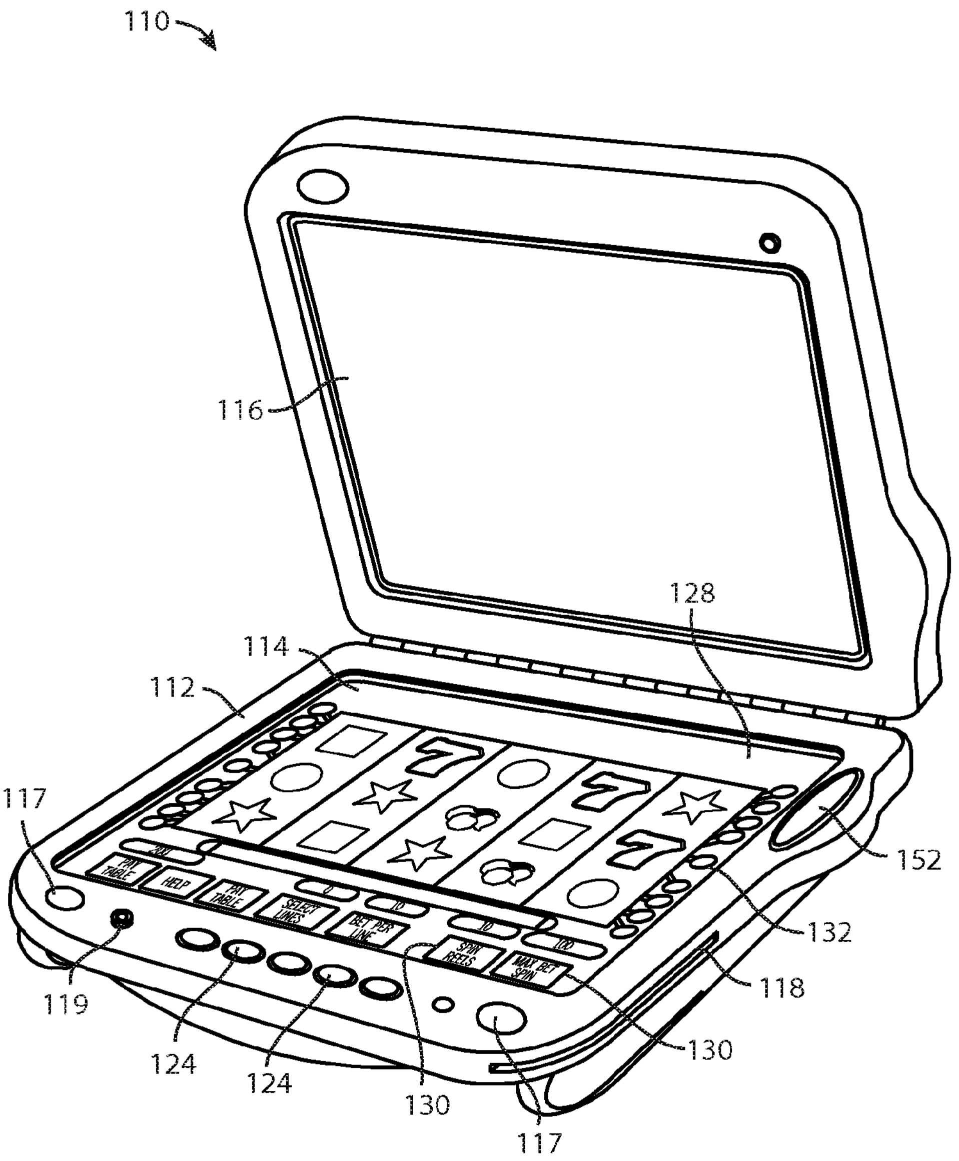
FIG. 1B is a perspective-view illustration of an exemplary handheld gaming device according to an embodiment of the present invention.

Depicted in FIG. 1B is a handheld or mobile gaming machine 110. Like the free standing gaming machine 10, the handheld gaming machine 110 is preferably an electronic gaming machine configured to play a video casino game such as, but not limited to, slots, keno, poker, blackjack, and roulette. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1B, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons may provide inputs for one aspect of the operating the game, while the touch keys 130 may allow for input needed for another aspect of the game. The various components of the handheld gaming machine 110 may be connected directly to, or contained within, the casing 112, as seen in FIG. 1B, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably takes the form of a high resolution LCD, a plasma display, an LED, or any other type of display suitable for use in the handheld gaming machine 110.

The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 18 or an assignment of credits stored on the handheld gaming machine via the touch screen keys 130, player input device 124, or buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1B, comprises a biometric sensing device.

The handheld device may incorporate the same features as the gaming terminal 10, or variations thereof. A more detailed description of a handheld device that may be utilized with the present invention can be found in PCT Patent Application No. PCT/US2007/000792, filed Jan. 26, 2007, and entitled "Handheld Device for Wagering Games," which is incorporated herein by reference in its entirety.

Figure 2:
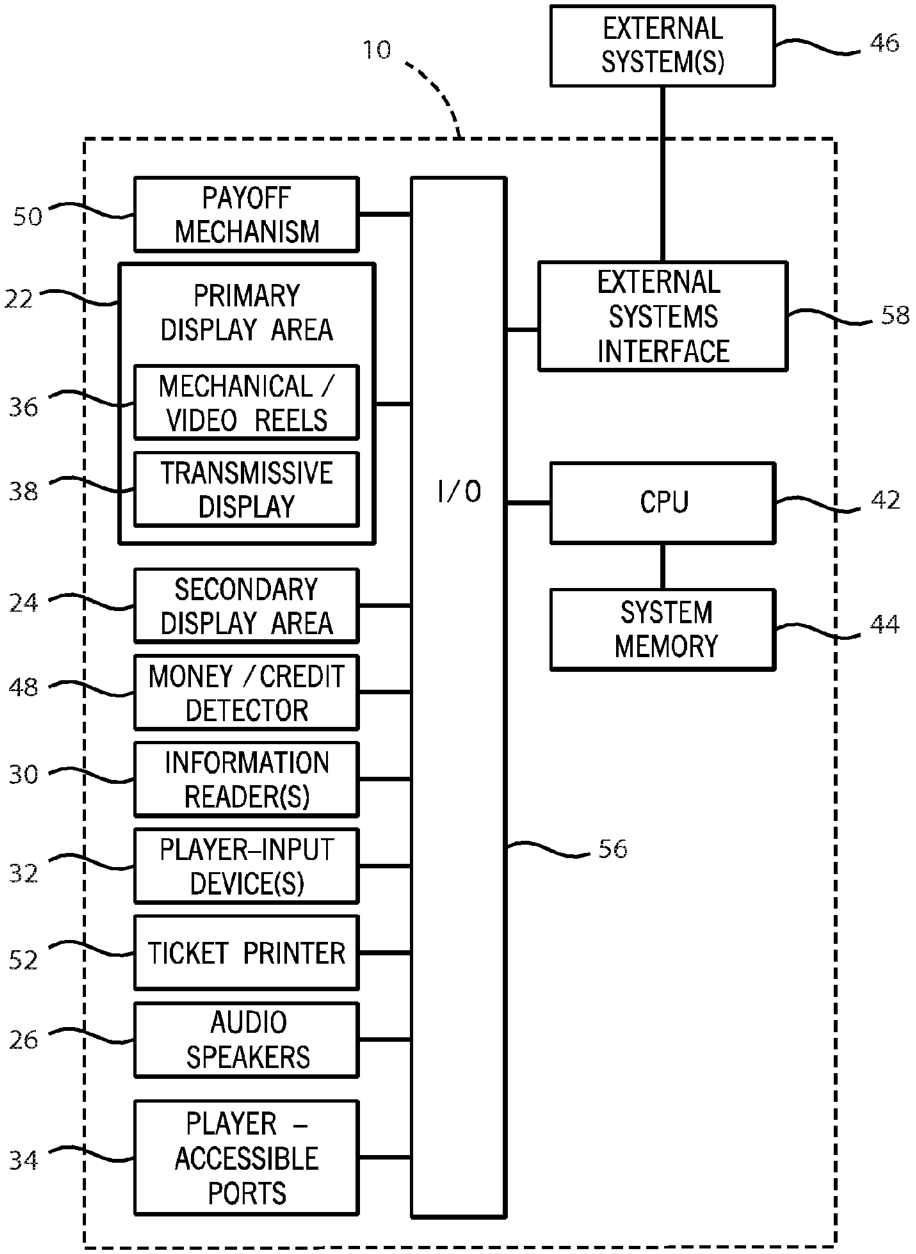
FIG. 2 is a schematic diagram of an exemplary gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming machine 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20, coin acceptor 22, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device(s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
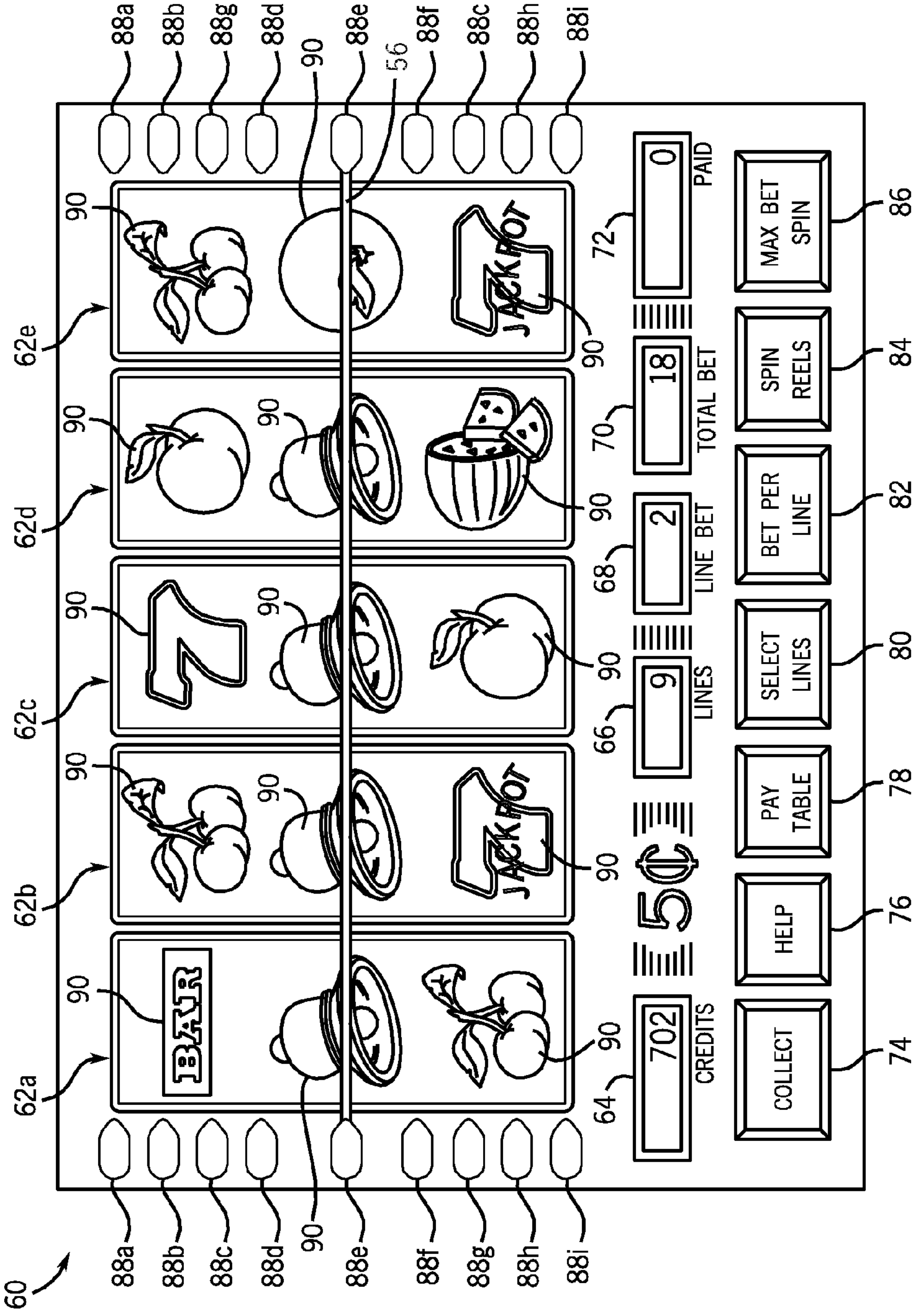
FIG. 3 is a screen shot of a basic-game screen from an exemplary wagering game that may be played on the gaming terminal of FIG. 1A, the handheld gaming device of FIG. 1B, and the gaming system of FIG. 2.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming terminal or gaming system in accord with the present concepts, the wagering game includes a game sequence in which a player makes a wager, such as through the money/credit detector 48, touch screen 38 soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1A, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example).

As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e*; and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 10 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, diagonally, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Figure 4:
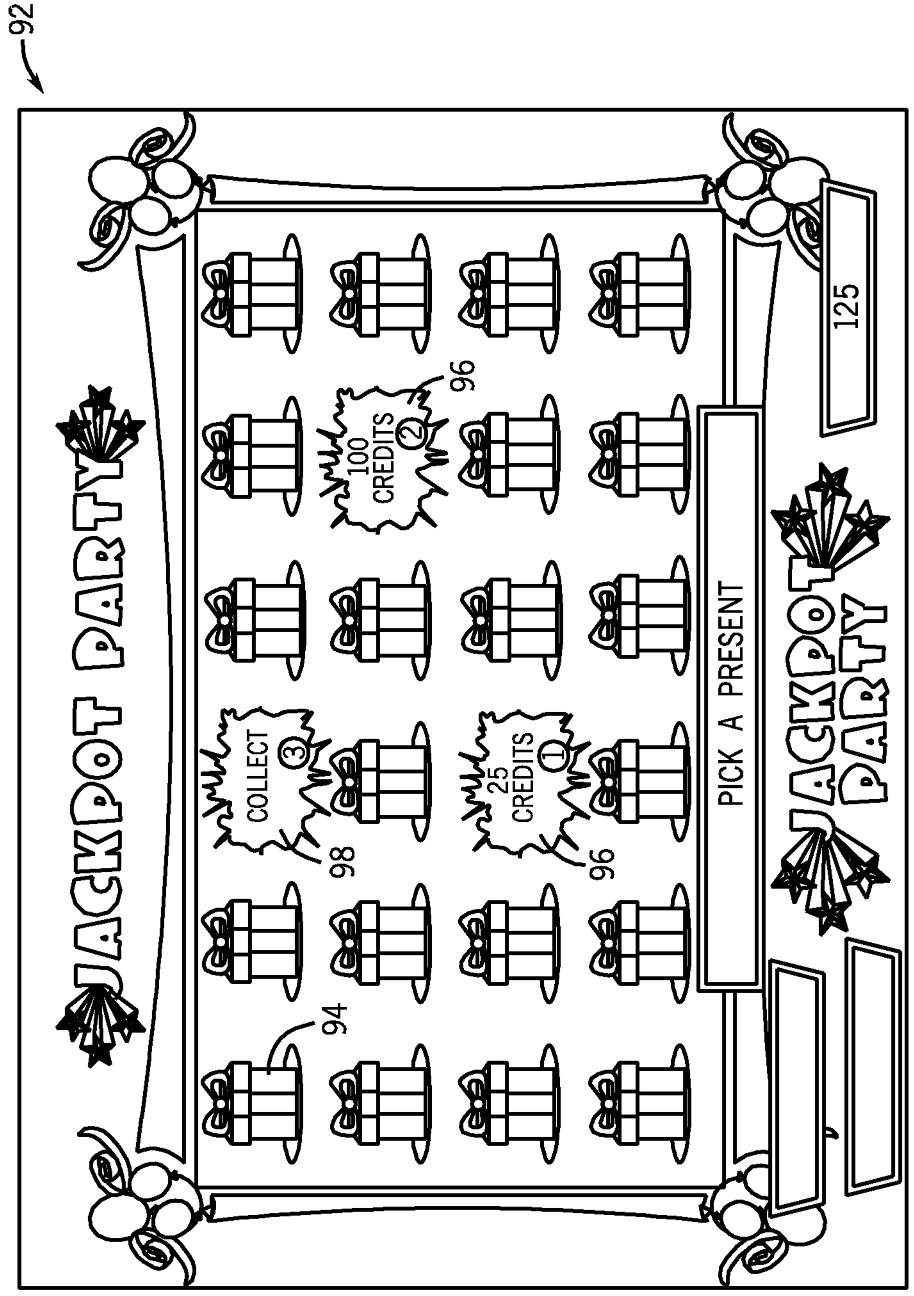
FIG. 4 is a screen shot of a bonus-game screen from an exemplary wagering game that may be played on the gaming terminal of FIG. 1A, the handheld gaming device of FIG. 1B, or the gaming system of FIG. 2.

Turning now to FIG. 4, an example of a bonus game to a basic wagering game is illustrated. A bonus-game screen 92 includes an array of markers 94 located in a plurality of columns and rows. The bonus game is entered upon the occurrence of a triggering event, such as the occurrence of a start-bonus game outcome (e.g., symbol trigger, mystery trigger, time-based trigger, etc.) in or during the basic wagering game. Alternatively, any bonus game described herein is able to be deployed as a stand-alone wagering game independent of a basic wagering game.

In the illustrated bonus game of FIG. 4, a player selects, one at a time, from the array of markers 94 to reveal an associated bonus-game outcome. According to one embodiment of this bonus game, each marker 94 in the array is associated with an award outcome 96 (e.g., credits or other non-negative outcomes) or an end-game outcome 98. In the illustrated example, a player has selected an award outcome 96 with the player's first two selections (25 credits and 100 credits, respectively). When one or more end-game outcome 98 is selected (as illustrated by the player's third pick), the bonus game is terminated and the accumulated award outcomes 96 are provided to the player.

Figure 5:
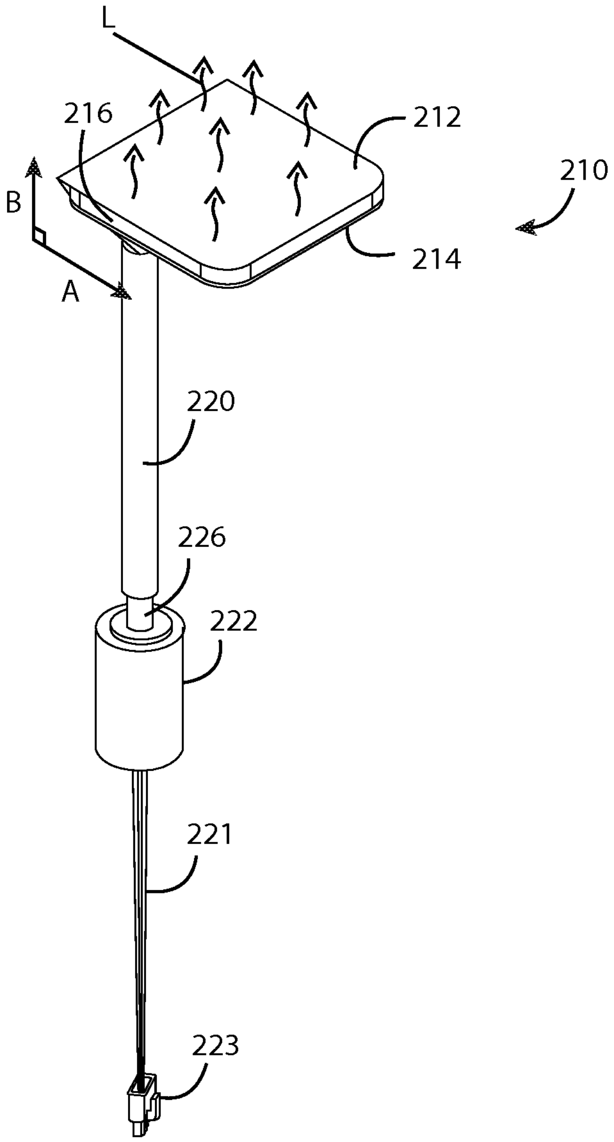
FIG. 5 is an isometric illustration of a multi-layer composite lighting assembly according to an embodiment of the present invention.
Figures 6, 6A:
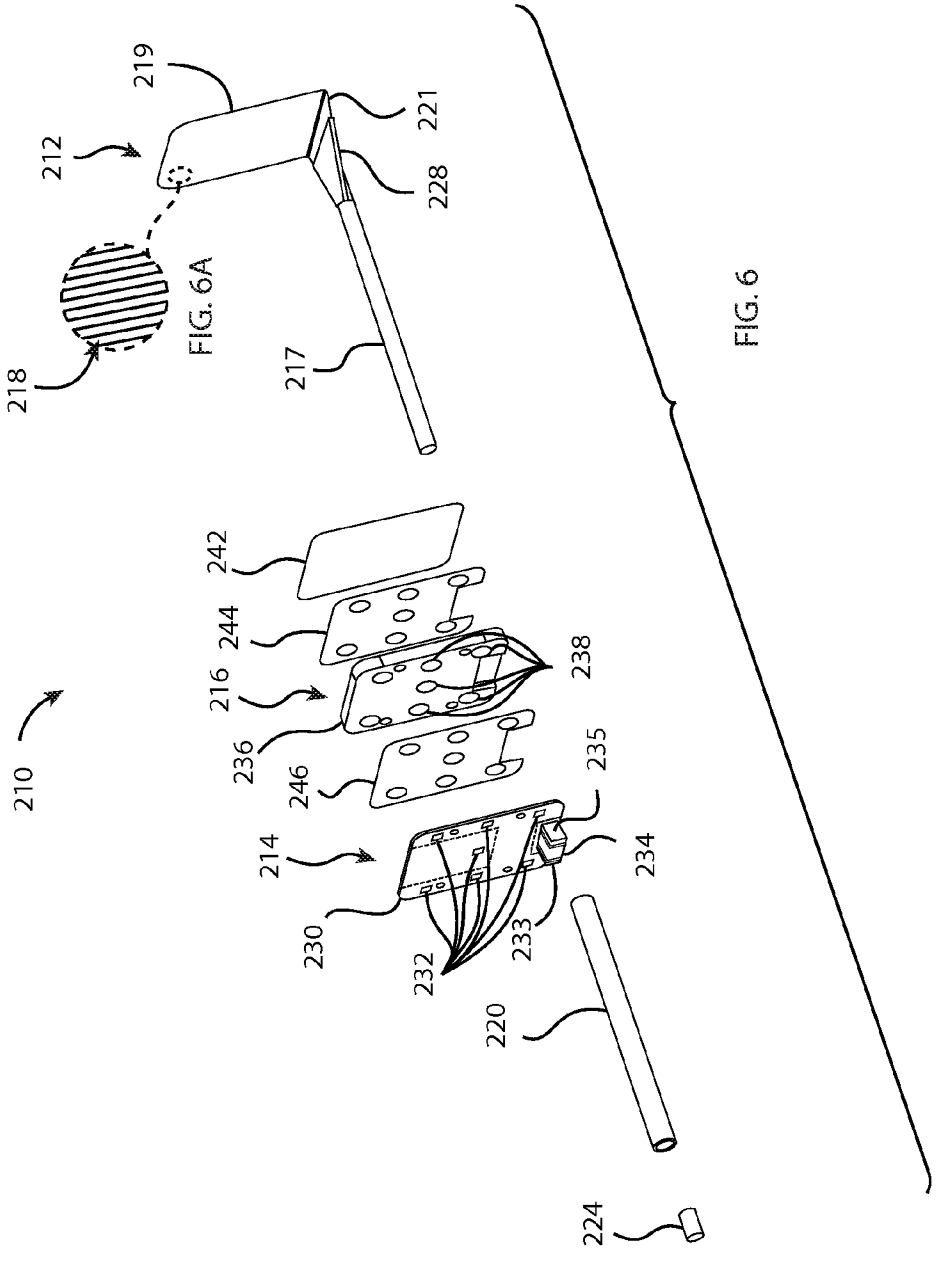
FIG. 6 is an exploded perspective-view illustration of the multi-layer composite lighting assembly of FIG. 5.
FIG. 6A is an enlarged perspective-view illustration of a portion of the multi-layer composite lighting assembly of FIG. 5 showing a plurality of individual strands of optical fibers.

Turning next to FIGS. 5 and 6, illustrated therein is a multi-layer composite lighting assembly, designated generally at 210, according to aspects of the present disclosure. In some embodiments, the composite lighting assembly 210 is operable to provide a 3-dimensional, dynamic simulation of a component or element of a wagering game, such as an element of the basic wagering game of FIG. 3 or the bonus game of FIG. 4. Although presented herein as simulating a gambling die that is employed in connection with play of a Monopoly™-themed bonus game, the concepts of the present disclosure are just as applicable to other aspects of other wagering games. By way of non-limiting example, the composite lighting assembly 210 could be employed to generate a 3-dimensional, dynamic simulation of a gambling die used in connection with play of other dice-based games, such as craps and backgammon, a tile used in connection with play of a tile-based game, such as dominos and mahjong, a playing card used in connection with a card-based game, such as poker, black jack, gin, and baccarat, and a bingo ball used in connection with a bingo or keno game. In addition, the composite lighting assembly 210 could be employed to generate a 3-dimensional, dynamic simulation of a marquee or other informational display without departing from the intended scope and spirit of the present invention.

The composite lighting assembly 210 of FIGS. 5 and 6 comprises three primary layers: a first light-emitting layer 212, a second light-emitting layer 214, and a spacer 216. The first light-emitting layer 212 is configured to emit light of a first color, such as red light, in a first direction, which is represented for explanatory purposes by arrow A in FIG. 5. In the embodiment illustrated in FIGS. 5 and 6, the first light-emitting layer 212 comprises a plurality of individual strands of optical fibers, which are more clearly visible as individual strands in FIG. 6A (collectively designated as 218). Each of the individual strands of optical fiber may include a light transmitting core of a suitable optically transparent material, such as silica, plastic, or fluorozirconate, fluoroaluminate, and other glass materials. The core is enclosed within an optically transparent outer sheath (or "cladding") of a second optically transparent material having a lower index of refraction than the core material to trap light in the core through substantially total internal reflection. The core and cladding may be coated with an optional buffer for protection from moisture and physical damage. Additional information on fiber optics may be found in "City of Light, The Story of Fiber Optics," by Jeff Hecht (Oxford University Press 1999), which is incorporated herein by reference in its entirety.

In some embodiments, a first end of the plurality of individual optical fibers 218 is bundled together to form an elongated, generally-cylindrical tail 217. Depending, for example, on the intended application, as well as packaging and cost constraints, the tail 217 may be approximately 10 inches (25.4 cm) long, with a diameter of approximately 0.37 inches (0.94 cm). The tail 217 may be wrapped in an optional braided plastic sleeve 220 to maintain the desired shape of the tail 217 and to protect the bundled optical fibers 218. Alternatively, the tail 217 may be bundled via adhesives, tapes, clamps, or other retaining devices. As best seen in FIG. 5, a distal tip of the tail 217 is optically coupled with a light source 222. The light source 222 may be a Luxeon™ III light assembly, which incorporate a 3 Watt Rebel Star Red LED, manufactured by Lumitex, Inc., of Strongsville, Ohio. Alternatively, the light source 222 may be a T1¾ (Torpedo) LED. Depending, for example, on the intended application, as well as packaging and cost constraints, the light source 222 may have a twelve inch (30.5 cm) long cable 221 with a 3-pin female connector 223. The light source 222 may take on other suitable forms, such as, for example, halogen, xenon, incandescent, metal-halide, and fluorescent light sources, singularly or in any combination.

The distal end of the tail 217 may be crimped and heat formed, and captured within a substantially optically clear cap 224 (FIG. 6), which may be fabricated from polytetrafluoroethylene (PTFE) (most commonly known as Teflon™), having a brass jacketing 226 (FIG. 5). In use, the cap 224 serves as an interface between the light source 222 and the distal ends of the individual optical fibers 218. The tail 217, in turn, acts as a light guide, transmitting light from the light source 222 to the second end of the plurality of individual optical fibers 218.

The second end of the plurality of individual optical fibers 218 may be juxtaposed—e.g., placed side-by-side, immediately adjacent one another, in one or more layers, and adhered together to form a sheet 219 that is designed to lie transversely across an outer face of the spacer 216. Depending, for example, on the intended application, as well as packaging and cost constraints, the sheet 219 may have a thickness of approximately 0.043 inches (0.11 cm), and is generally square, with sides that are approximately 3.5 inches (8.9 cm) in length. The edges of the sheet 219 may be sealed to prevent inadvertent breakage of the individual optical fibers. A transition section 221 of the optical fibers 218, which extends between and connects the tail 217 and sheet 219, may be partially enclosed within a protective outer jacket 228, as seen in FIG. 6. Depending, for example, on the intended application, as well as packaging and cost constraints, the transition section 221 may be approximately 4 inches (10.2 cm) long and have a generally triangular plan-view profile. As seen in FIG. 5, the tail 217 of the plurality of individual optical fibers 218 extends at approximately a 90 degree angle from the sheet 219.

Light generated by the light source 222 is transmitted along the longitudinal expanse of the optical fibers 218 from the tail 217, through the transition section 221, to the sheet 219. The sheet 219 is designed, in some embodiments, to generate a generally planar surface of colored light. For instance, the sheet 219 radiates light generated by the light source 222 outwardly toward the player (represented for explanatory purposes by the light arrows L in FIG. 5). One possible manner for providing this feature is by causing disruptions, mechanical, chemical, or otherwise, on the outer surface of the optical fibers 218 at discrete locations along the length of the sheet 219. These disruptions may be created, for example, by marring, abrading, or scratching the cladding of the individual optical fibers. The intensity of the light emitted by the sheet 219 can be modified, for example, by varying the depth, size, and frequency of these disruptions.

With continuing reference to FIGS. 5 and 6, the second light-emitting layer 214 is configured to emit light of a second color, such as white light, in a second direction, which is represented for explanatory purposes by arrow B in FIG. 5. In the embodiment illustrated in FIGS. 5 and 6, the second light-emitting layer 214 comprises a plurality of light emitting diodes (LEDs) 232 that are mounted on an LED printed circuit board (PCB) 230. Although seven LEDs 232 are shown mounted to the LED PCB 230 of FIG. 6, greater or fewer than seven LEDs can be mounted to the LED PCB 230, positioned at similar or different locations, without departing from the intended scope and spirit of the present invention. In one optional configuration, each of the LEDs 232 may comprise an LED with a colored lens or cap on one end to illuminate the optical fibers 218 of the first light-emitting layer 212 (thereby eliminating the need for the separate light source 222), whereas the second end of the torpedo LED is bare or provided with an alternatively colored lens/cap to produce the requisite colored light provided by the second light-emitting layer 214.

To provide electrical power to and/or control of the assembly 210, the LED PCB 230 may include three multi-point terminal blocks 233, 234, 235: the first terminal block 233 is a power input for the LEDs 232; the second terminal block 234 controls the activation of the LEDs 232; and the third terminal block 235 powers and controls the first light source 222. Each of the LEDs 232 is generally orthogonally oriented with respect to second end of the plurality of individual optical fibers 218. Consequently, the direction B of the light emitted by the second light-emitting layer 214 is generally orthogonal with respect to the direction A of the light being transferred through the second end of the first light-emitting layer 212. Fewer or greater than three terminal blocks may be provided for the assembly 210 without departing from the intended scope and spirit of the present invention. Likewise, other conventional means for powering and/or controlling the assembly 210 are well known.

The spacer 216 is interposed between the first and second light-emitting layers 212, 214. The spacer 216 may be configured to receive and diffuse the light emitted by the second light-emitting layer 214, scattering some of the light to create a radiating glow. In one exemplary configuration, the spacer 216 of FIGS. 5 and 6 comprises a translucent plate 236 with a plurality of channels 238 that extend therethrough. The plate 236 may be fabricated, for example, from acrylonitrile butadiene styrene (ABS) or other suitable polymeric materials. The plate 236 material may be colored (e.g., with a red dye) to create a particularly colored glow when diffusing the light emitted by the second light-emitting layer 214. Alternatively, the plate 236 may be lacking visible color such that light radiated therefrom takes on the color of the light source. Depending, for example, on the intended application, as well as packaging and cost constraints, the plate 236 may have a thickness of approximately 0.3 inches (0.76 cm), and have generally square geometry, with sides that are approximately 3.5 inches (8.9 cm) in length. The edges of the plate 236 may have round-chamfered corners with a radius of approximately 0.5 inches (1.3 cm). With this geometry, the plate 236 has a similar plan-view profile as the sheet 219 of the first light-emitting layer 212, as seen in FIG. 6. As such, in some embodiments, the sheet 219 spans substantially the entirety of (i.e., is generally coextensive with) the spacer 216.

The spacer 216 may be further configured to receive and isolate the light emitted by the second light-emitting layer 214, and focus the light through the second end of the first light-emitting layer 212. In one exemplary configuration, each channel 238 may be generally cylindrical with a diameter of approximately 0.5 inches (1.3 cm). While the illustrated embodiment shows the channels 238 as circularly cylindrical, other geometric variations, such as an elliptic or polygonal cylinder, are also envisioned. The rear opening of each channel 238 is aligned with at least one of the LEDs 232 on the LED PCB 230, whereas the front opening of each channel 238 opens toward the sheet 219 thereby optically coupling the second light-emitting layer 214 with of the first light-emitting layer 212. The LEDs 232 are oriented to project light through the sheet 219 of the first light-emitting layer 212. In one exemplary embodiment, each LED 232 projects a white beam of light generating a white dot on the forward face of the red surface generated by the first light-emitting layer 212. The activation and deactivation of the individual LEDs 232 can therefore be controlled to simulate the dots or "pips" of a rolling die. For example, the center LED 232 (visible in FIG. 6) can be activated alone to simulate the side of a die with one pip, two opposing-corner LEDs 232 (visible in FIG. 6) can be activated to simulate the side of a die with two pips, the center LED and two opposing-corner LEDs 232 can be activated to simulate the side of a die with three pips, and so on and so forth. In addition, these LED combinations can be activated erratically to simulate a rolling die.

In some embodiments, the multi-layer composite lighting assembly 210 also includes a layer of polyethylene terephthalate (PET) 242 (most commonly known as Mylar™), interposed between the first light-emitting layer 212 and the spacer 216. The PET layer 242 acts to conceal the channels 238 in the spacer 216 when the LED 232 associated therewith is not activated (the channels 238 being otherwise visible through the sheet 219 of optical fibers 218 without the PET layer 242). According to the illustrated embodiment, the PET layer 242 span substantially the entirety of the sheet 219. It may be desirable, in some embodiments, to design the composite lighting assembly 210 without a PET layer or an optical diffuser on the front side of the first light-emitting layer 212, otherwise the light emitted by the second light-emitting layer 214 through the first light-emitting layer 212 could be blurred or distorted. Likewise, an optional optical diffuser could be interposed between the first light-emitting layer 212 and the spacer 216 to provide additional concealment of the spacer channels 238, as described below with respect to FIG. 8.

The assorted layers of the composite lighting assembly 210 may be coupled together by a variety of means. For example, according to the embodiment of FIG. 6, the first light-emitting layer 212 is adhered directly to a front side of the PET layer 242 (e.g., via a layer of adhesive). The PET layer 242, in turn, is adhered directly to a front side of the spacer 216 via a first two-sided adhesive sheet 244, whereas the LED PCB 230 is adhered directly to a rear side of the spacer 216 via a second two-sided adhesive sheet 246. As an alternative to adhesives, one or more of these layers may be operatively attached to the adjoining layers via mechanical fasteners, such as clamps or threaded fasteners. It is also envisioned that one or more of these layers be preformed as a single piece, unitary structure. It is also within the scope and spirit of the present invention to omit layers, include additional layers, and/or modify the order presented above. Likewise, use of the term "layer" in the description and claims does not necessarily require that particular segment of the composite construction span the entirety of (i.e., be coextensive with) all remaining layers unless otherwise explicitly stated in the claims.

Figure 7:
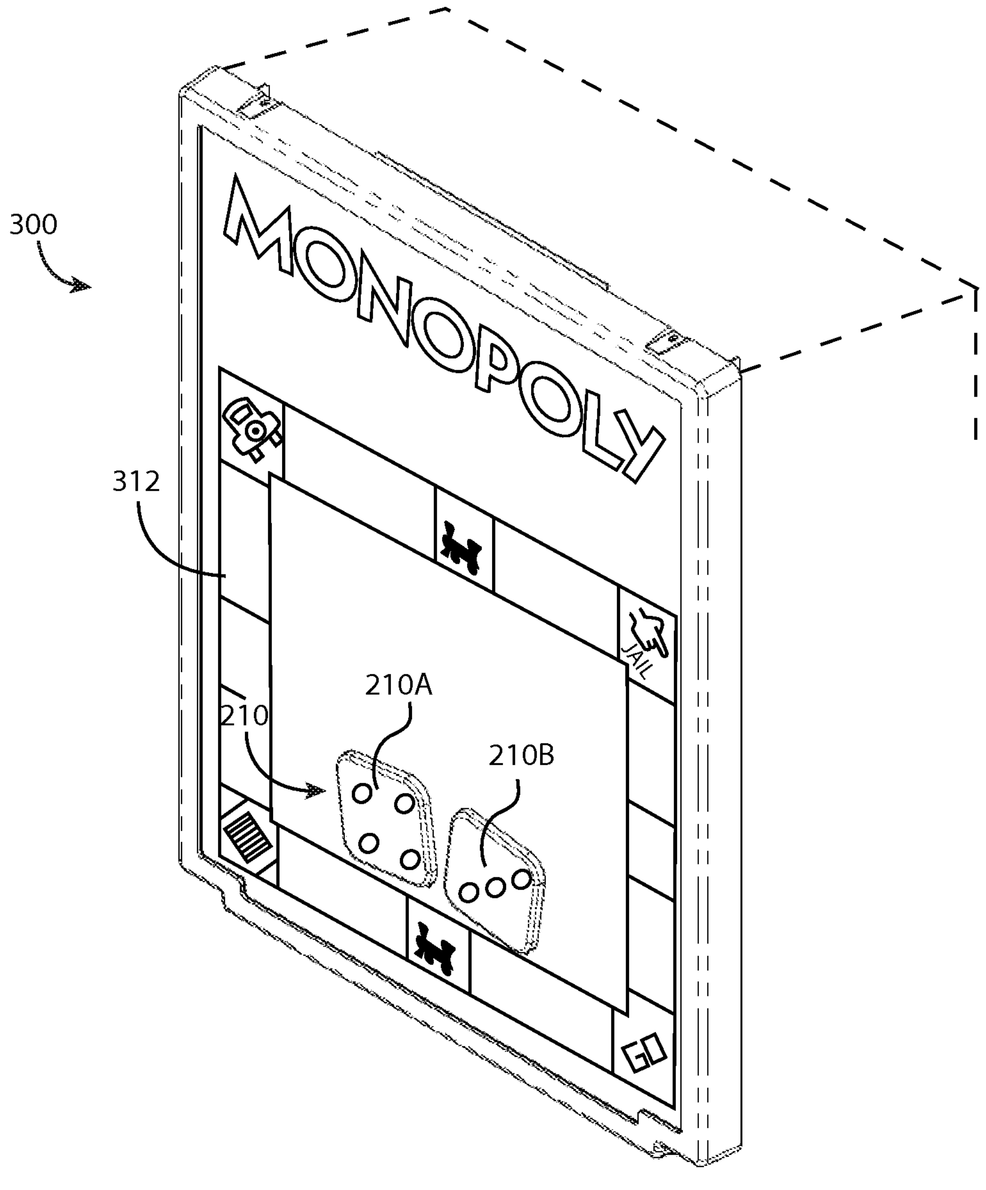
FIG. 7 is an isometric illustration of a display with a 3-dimensional dice-simulating assembly according to an embodiment of the present invention.

FIG. 7 is an isometric illustration of a display 300 with the composite dice-simulating assembly 210 according to aspects of the present disclosure. The display 300 may be part of the gaming terminal 10 illustrated in FIG. 1A, the mobile gaming machine 110 of FIG. 1B, the gaming system illustrated in FIG. 2, other gaming devices and systems, or any combination thereof. For example, the display 300 can be integrated into or replace the primary and/or secondary display areas 14, 16. Alternatively, the display 30 may be attached to the gaming terminal 10 of FIG. 1A at locations other than the primary and/or secondary display areas 14, 16. In addition, the display 300 may be modified (e.g., reduced in size) and incorporated into the mobile gaming machine 110 of FIG. 1B. By way of non-limiting example, the display 300 may be integrated into or replace the primary and/or secondary display areas 114, 116. As another option, the display 300 may be associated with a bank of gaming terminals.

In the embodiment illustrated in FIG. 7, the secondary display 300 is a polarized top-glass display 312 with information and artwork printed thereon relating to a board-game themed bonus game. The information and artwork shown in FIG. 7 is permanent (i.e., does not move), and may be backlit to provide special effects during game play. Additional information on top-glass and belly-glass displays, including related features, may be found in U.S. Pat. No. 6,368,216 B1, to Joseph R. Hedrick et al., entitled "Gaming Machine having Secondary Display for Providing Video Content," which issued on Apr. 9, 2002, and is incorporated herein by reference in its entirety. Alternatively, the display 300 may be an active display, including video graphics, or a transmissive display, including video graphics and permanently printed artwork.

The 3D dice-simulating assembly 210 is designed to create a three-dimensional simulation of one or more components of a wagering game. In the embodiment of FIG. 7, for example, the assembly 210 simulates first and second gambling dice 210A and 210B, respectively, that are used in connection with playing a Monopoly™-themed bonus game. Each of the simulated gambling die 210A, 210B may be provided by incorporating into the top-glass display 312 the multi-layer composite lighting assembly 210 illustrated in FIGS. 5 and 6. Alternatively, each of the simulated gambling die 210A, 210B may be provided by incorporating into the top-glass display 312 the various multi-layer composite lighting assembly 410 options described with respect to FIG. 8, which are explained in detail below. In contrast to standard graphical displays, such as a conventional CRT display, LCD display, plasma display, DLP projection display, electroluminescent (EL) panel, etc., which are limited to creating a 2-dimensional representation of a 3-dimensional object, the 3D dice-simulating assembly 210 creates a tangible 3-dimensional representation (i.e., visible along its width, length, and depth) of one or more 3-dimensional objects, such as the dice 210A, 210B.

Figure 8:
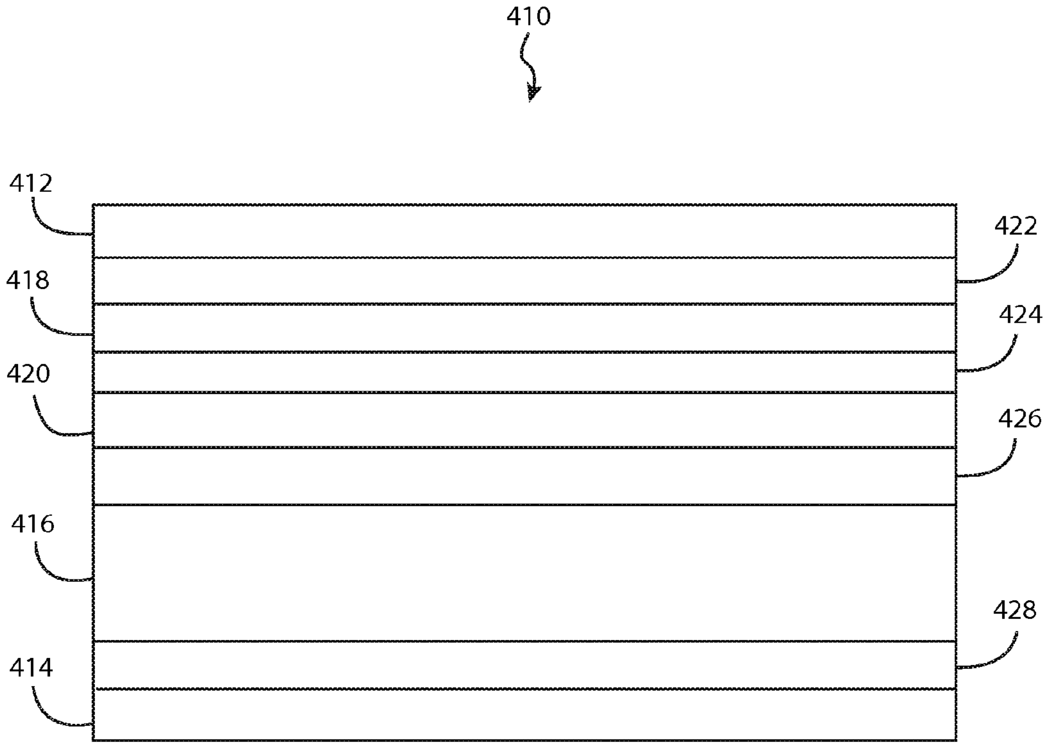
FIG. 8 is a schematic side-view illustration of a multi-layer composite lighting assembly according to an embodiment of the present invention.

Turning next to FIG. 8, illustrated therein is a multi-layer composite lighting assembly, designated generally at 410, according to other aspects of the present disclosure. In some embodiments, the composite lighting assembly 410 is operable to provide a 3-dimensional, dynamic simulation of a component or element of a wagering game, such as an element of the basic wagering game of FIG. 3 or the bonus game of FIG. 4. By way of non-limiting example, the multi-layer composite lighting assembly 410 may be utilized to simulate a gambling die that is employed in connection with play of a Monopoly™-themed bonus game. The multi-layer composite lighting assembly 410 is depicted in FIG. 8 as comprising nine layers: a first layer 412, a second layer 414, a third layer 416, a fourth layer 418, a fifth layer 420, a sixth layer 422, a seventh layer 424, an eighth layer 426 and a ninth layer 428. As will be readily apparent from the following discussion, it is also within the scope and spirit of the present invention to omit layers, include additional layers, and/or modify the order presented.

According to some embodiments, the first layer 412 is a first light-emitting layer, the second layer 414 is a second light-emitting layer, the third layer 416 is a spacer, the fourth layer 418 is an optical diffuser, the fifth layer 420 is a layer of PET, and the sixth, seventh, eighth and ninth layers 422, 424, 426, 428 are first, second, third and fourth layers of adhesive, respectively. In this instance, the first layer of adhesive 422 adheres the first light-emitting layer 412 to the optical diffuser 418, the second layer of adhesive 424 adheres the optical diffuser 418 to the layer of PET 420, the third layer of adhesive 426 adheres the layer of PET 420 to the spacer 416, and the fourth layer of adhesive 428 adheres the second light-emitting layer 414 to the spacer 416 on the opposite side of the first light-emitting layer 412. Optionally, one or more of the adhesive layers 422, 424, 426, 428 may be replaced by mechanical fasteners. As another alternative, the adhesive layers 422, 424, 426, 428 may be eliminated altogether with the remaining layers 412, 414, 416, 418 being operatively coupled by alternative means, such as a bracket, clasp, or bezel.

Continuing with the above example, the first light-emitting layer 412 may comprise a first sheet of optical fibers, with the first ends of the optical fibers being in optical communication with a first light source and second ends of the optical fibers extending transversely across the spacer. Likewise, the second light-emitting layer 414 may comprise a second sheet of optical fibers, with the first ends of the optical fibers being in optical communication with a second light source and second ends of the optical fibers extending transversely across the spacer. In this example, the first and second light-emitting layers 412, 414 of FIG. 8 may each be similarly configured to the first light-emitting layer 212 of FIGS. 5 and 6. As an optional alternative, the first light-emitting layer 412 may comprise an edge-lit display assembly comprising a light source, such as an LED array, that is optically coupled to an edge of a non-emissive panel. Another optional alternative is for the second light-emitting layer 414 to comprise a plurality of LEDs mounted on an LED printed circuit board, such as the LEDs 232 and LED PCB 230 of FIG. 6.

In one exemplary configuration, the spacer 416 may comprise a translucent plate 236 with a plurality of channels 238 that extend therethrough. In this regard, the spacer 416 of FIG. 8 may be similarly configured with the spacer 216 of FIGS. 5 and 6. Alternatively, the spacer 416 of FIG. 8 may comprise one or more optical light pipes that optically couple the first light-emitting layer 412 to the second light-emitting layer 414. The outer surface of each light pipe may be provided with an optional surface coating, surface treatment or outer sleeve to more thoroughly trap light inside the light pipe. Moreover, each of the optical light pipes could extend partially or all the way through the first light-emitting layer 412, rather than being pressed against an underside surface of the first light-emitting layer 412. Another optional configuration includes a plurality of opaque, hollow cylinders as the spacer 216, each of which receives, isolates, and directs light emitted by the second light-emitting layer 416 through the first light-emitting layer 412. It may also be desirable, depending, for example, on the intended use of the multi-layer composite lighting assembly 410, to provide air gaps between the spacer 416 and the first and second light-emitting layers 412, 414 to soften the light diffused by the spacer 416.

With continuing reference to FIG. 8, an alternative embodiment of the present disclosure includes the first layer 412 being a translucent panel, the second layer 414 being a first light-emitting layer, the third layer 416 being a second light-emitting layer, the fourth layer 418 being an array of optical couplers, and the fifth and ninth layers 420, 428 being first and second sets of mechanical fasteners, respectively. In this example, the sixth, seventh and eighth layers 422, 424, 426 are eliminated from the multi-layer composite lighting assembly 410. In this exemplary configuration, the first and second light-emitting layers 414, 416 may each be LED printed circuit boards, similarly configured, for example, to the LED PCB 230 of FIG. 6. The first set of mechanical fasteners 420 operatively attaches the second light-emitting layer 416 to the translucent panel 412, whereas the second set of mechanical fasteners 428 operatively attaches the first light-emitting layer 414 to the second light-emitting layer 416. Each of the optical couplers 418 of this example may comprise a light pipe that optically couples a respective LED borne by the first light-emitting layer 414 with the translucent panel 412. In operation, the second light-emitting layer 416 bombards the underside surface of the translucent panel 412 with colored light (such as red light), with the translucent panel 412 then diffusing the light to create a colored 3-dimensional surface. The light generated by the first light-emitting layer 414 is received by, isolated, and transmitted through the optical couplers 418 to the underside surface of the translucent panel 412 to create colored dots (such as the white pips described above with respect to FIGS. 5 and 6) on the outer surface of the translucent panel 412.

Figure 9:
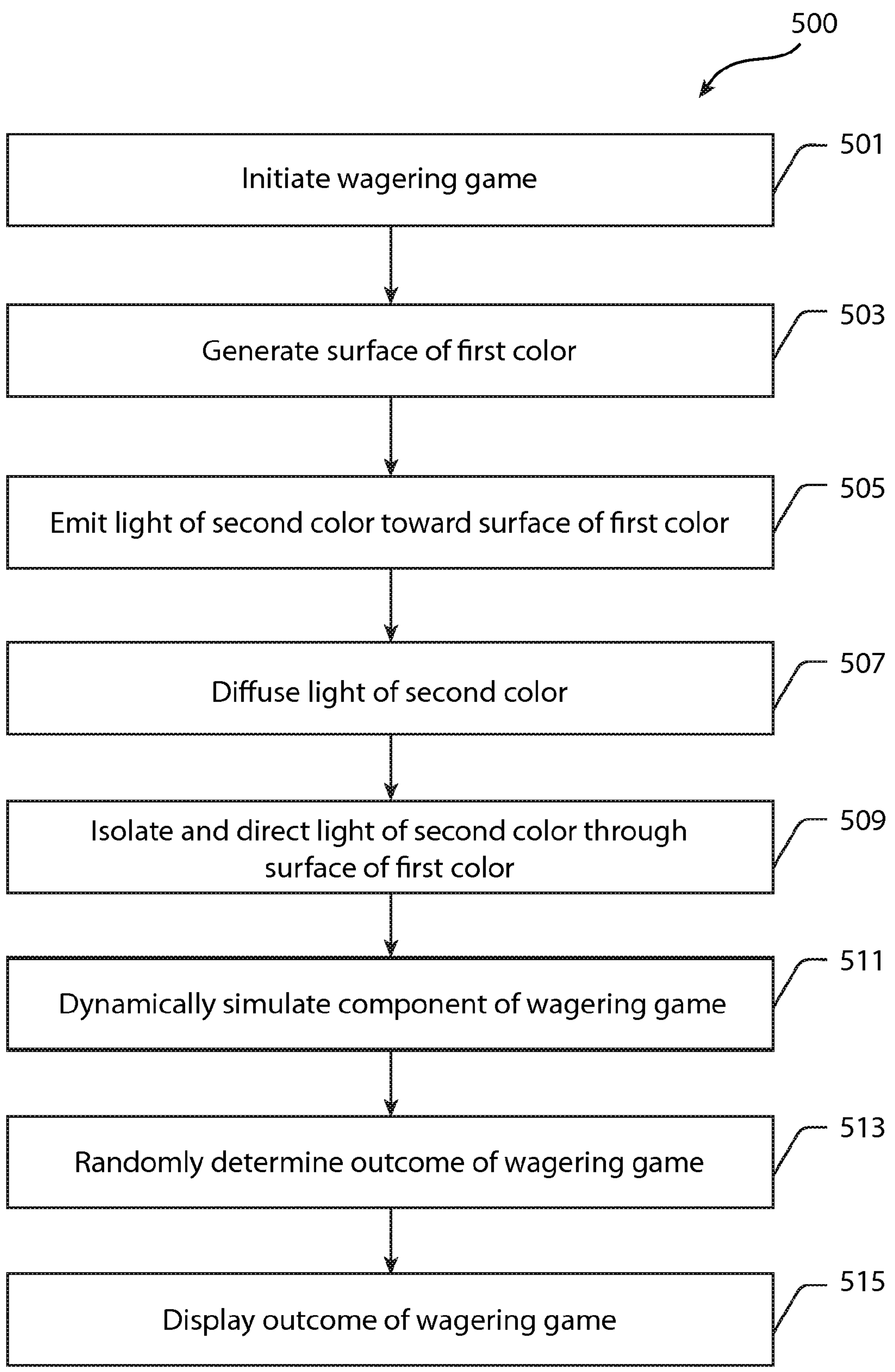
FIG. 9 is a flowchart for an algorithm that corresponds to instructions executed by a controller in accord with at least some aspects of the disclosed concepts.

With reference now to the flow chart of FIG. 9, an improved method for dynamically simulating a component of a wagering game on a gaming device is generally described at 500 in accordance with certain embodiments. FIG. 9 represents one algorithm that corresponds to at least some instructions executed by the controller 42 and/or external systems 46 in FIG. 2 to perform any or all of the above described functions associated with the disclosed concepts.

The exemplary algorithm 500 of FIG. 9 includes, at block 701, initiating a wagering game using, for example, CPU/controller 42 of FIG. 2. The wagering game may include those games described above with respect to FIGS. 3 and 4, or any other wagering game. Prior to, contemporaneously with, or after block 501, the method 500 includes creating a 3-dimensional simulation of a component or element of the wagering game. As represented at block 503, this may include, for example, generating a surface of a first color (e.g., red) via a first light-emitting layer of a multi-layer composite lighting assembly, such as the first light-emitting layers described above with respect to FIGS. 6 and 8. In addition, creating the 3-dimensional simulation may also include, as denoted by block 505, emitting light of a second color (e.g., white) distinct from the first color via a second light-emitting layer of a multi-layer composite lighting assembly, such as the second light-emitting layers described above with respect to FIGS. 6 and 8. The light emitted by the second light-emitting layer is received and diffused by a spacer of the multi-layer composite lighting assembly, as indicated at block 507. Moreover, the light emitted by the second light-emitting layer is also isolated and focused through the surface generated by the first light-emitting layer, as indicated at block 509. At block 511, the method 500 includes dynamically simulating the component of the wagering game. This may include selectively varying the light output of the first and/or second light emitting layers, as described above. In block 513, the method 500 includes randomly determining an outcome of the wagering game and, at block 515, displaying the outcome of the wagering game. The outcome of the wagering game may be inclusive of or exclusive to the dynamically simulated component of the wagering game.

In some embodiments, the method includes at least those steps enumerated above. It is also within the scope and spirit of the present invention to omit steps, include additional steps, and/or modify the order presented above. It should be further noted that the method 500 represents a single simulation of a component of a wagering game. However, it is expected that the method 500 be applied in a systematic and repetitive manner.

While many preferred embodiments and best modes for carrying out the present invention have been described in detail above, those familiar with the art to which this invention relates will recognize various alternative designs and embodiments for practicing the invention within the scope of the appended claims.

The invention claimed is:

1. A gaming device for playing a wagering game, the gaming device comprising:

an input device configured to receive an indication of a wager to play the wagering game;

a display configured to display an outcome of the wagering game; and a multi-layer composite lighting assembly, including:

a first light-emitting layer configured to direct light of a first color in a first direction;

a second light-emitting layer configured to direct light of a second color in a second direction, the second color being different from the first color, and the second direction being different from the first direction; and a spacer interposed between and coupled to both the first and second light-emitting layers, the spacer being configured to receive and focus at least a portion of the light emitted by the second light-emitting layer through at least a portion of the light emitted by the first light-emitting layer thereby creating a three-dimensional component of the wagering game, wherein one or more outcomes of the wagering game are dependent, at least in part, upon the light received by the spacer from the second light-emitting layer and focused by the spacer through the light of the first light-emitting layer.

2. The gaming device of claim 1, wherein the first light-emitting layer comprises a sheet of optical fibers with first ends of the optical fibers in optical communication with a first light source and second ends of the optical fibers extending transversely across the spacer.

3. The gaming device of claim 2, wherein the second light-emitting layer comprises a second sheet of optical fibers with first ends of the optical fibers in optical communication with a second light source and second ends of the optical fibers extending transversely across the spacer.

4. The gaming device of claim 1, wherein the first light-emitting layer comprises a plurality of individual optical fibers, a first end of the plurality of individual optical fibers being bundled together to form a tail with a distal tip in optical communication with a first light source, and a second end of the plurality of individual optical fibers being juxtaposed to form a sheet extending transversely across the spacer.

5. The gaming device of claim 1, wherein the first light-emitting layer comprises an edge-lit display with a light source optically coupled to a non-emissive panel.

6. The gaming device of claim 1, wherein the second light-emitting layer comprises a plurality of light emitting diodes (LEDs) mounted on a printed circuit board.

7. The gaming device of claim 1, wherein the spacer comprises a plate defining therethrough at least one channel, the at least one channel optically coupling the second light-emitting layer with the first light-emitting layer.

8. The gaming device of claim 1, wherein the spacer comprises a plate defining therethrough a plurality of channels, and the second light-emitting layer includes a plurality of discrete light sources, each of the discrete light sources projecting light through a respective one of the channels defined through the spacer.

9. The gaming device of claim 1, wherein the spacer comprises at least one optical light pipe optically coupling the second light-emitting layer with the first light-emitting layer.

10. The gaming device of claim 1, wherein the multi-layer composite lighting assembly further comprises an optical diffuser interposed between the first light-emitting layer and the spacer.

11. The gaming device of claim 1, wherein the multi-layer composite lighting assembly further comprises a polyethylene terephthalate (PET) layer interposed between the first light-emitting layer and the spacer.

12. The gaming device of claim 1, wherein the first light-emitting layer is adhered to a first side of the spacer and the second light-emitting layer is adhered to a second side of the spacer opposite the first side thereof.

13. The gaming device of claim 1, wherein the first light-emitting layer has a surface emanating the first color, the second light-emitting layer projecting light through the surface of the first light-emitting layer with substantially no blending of the first and second colors.

14. The gaming device of claim 1, wherein the component of the wagering game includes at least one gambling die, and wherein rolling of the at least one gambling die is simulated by varying the light output of at least one of the first and second light-emitting layers.

15. The gaming device of claim 8, wherein a bonus-game outcome of the wagering game is dependent, at least in part, upon which one or ones of the channels of the spacer are transmitting light emitted by the second light-emitting layer through light emitted by the first light-emitting layer.

16. A gaming system comprising:

at least one input device configured to receive an indication of a wager to play a wagering game;

at least one display device configured to display an outcome of the wagering game;

at least one controller configured to execute the wagering game; and a multi-layer composite lighting assembly, including:

a first light-emitting layer configured to direct light of a first color in a first direction;

a second light-emitting layer configured to direct light of a second color in a second direction, the second color being different from the first color, and the second direction being different from the first direction; and a spacer interposed between and attached to both the first and second light-emitting layers, the spacer being configured to diffuse at least a portion of the light emitted by the second light-emitting layer and focus at least a portion of the light emitted by the second light-emitting layer through at least a portion of the light emitted by the first light-emitting layer, wherein one or more outcomes of the wagering game are dependent, at least in part, upon the light received by the spacer from the second light-emitting layer and focused by the spacer through the light of the first light-emitting layer.

17. The gaming system of claim 16, wherein the first light-emitting layer comprises a plurality of individual optical fibers, a first end of the plurality of individual optical fibers being bundled together to form a tail with a distal tip thereof in optical communication with a first light source, and a second end of the plurality of individual optical fibers being juxtaposed to form a sheet extending transversely across the spacer.

18. The gaming system of claim 17, wherein the second light-emitting layer comprises a plurality of light emitting diodes (LEDs) each of which is generally orthogonally oriented with respect to the second end of the plurality of individual optical fibers.

19. The gaming system of claim 18, wherein the spacer comprises a translucent plate defining therethrough a plurality of channels, each of the channels optically coupling at least one of the LEDs of the second light-emitting layer with the second end of the first light-emitting layer.

20. The gaming system of claim 19, wherein the multi-layer composite lighting assembly further comprises a polyethylene terephthalate (PET) layer interposed between the first light-emitting layer and the spacer.

21. The gaming system of claim 20, wherein the first light-emitting layer is adhered directly to the PET layer, the PET layer is adhered directly to the spacer, and the spacer is adhered directly to the second light-emitting layer.

22. The gaming system of claim 16, wherein the spacer of the multi-layer composite lighting assembly includes a plurality of channels each being configured to receive and transmit at least a portion of the light emitted by the second light-emitting layer, and wherein at least one outcome of the wagering game is dependent, at least in part, upon which one or ones of the channels of the spacer are transmitting light emitted by the second light-emitting layer through light emitted by the first light-emitting layer.

23. The gaming system of claim 16, wherein the-multi-layer composite lighting assembly creates a three-dimensional component representing a gambling die, and wherein rolling of the gambling die is simulated by varying the light output of at least one of the first and second light-emitting layers.

24. The gaming system of claim 23, wherein a bonus-game outcome of the wagering game is dependent, at least in part, upon the simulated rolling of the three-dimensional gambling die created by the multi-layer composite lighting assembly.

25. A method for playing a wagering game on a gaming system, the method comprising:

initiating the wagering game using at least one processor;

creating a three-dimensional component of the wagering game, including:

generating a surface of a first color via a first light-emitting layer of a multi-layer composite lighting assembly;

emitting light of a second color distinct from the first color via a second light-emitting layer of the multi-layer composite lighting assembly;

diffusing at least a portion of the light emitted by the second light-emitting layer via a spacer coupled to both the first and second light-emitting layers of the multi-layer composite lighting assembly; and focusing at least a portion of the light emitted by the second light-emitting layer through the surface generated by the first light-emitting layer via the spacer;

randomly determining, via at least one processor, an outcome of the wagering game; and causing at least one display device to display the wagering game outcome, wherein one or more outcomes of the wagering game are dependent, at least in part, upon the light emitted by the second light-emitting layer and focused by the spacer through the light of the first light-emitting layer.

26. A gaming machine for playing a wagering game, the gaming machine comprising:

an input device configured to receive a wager to play the wagering game;

a display configured to display one or more outcomes of the wagering game; and a multi-layer composite lighting assembly positioned so as to not visibly obstruct the display, the multi-layer composite lighting assembly including:

a first light-emitting layer configured to direct light of a first color in a first direction;

a second light-emitting layer configured to direct light of a second color in a second direction, the second color being different from the first color, and the second direction being different from the first direction; and a spacer interposed between and coupled to both the first and second light-emitting layers, the spacer including a plurality of channels each being configured to receive and transmit at least a portion of the light emitted by the second light-emitting layer through at least a portion of the light emitted by the first light-emitting layer, wherein at least one of the outcomes of the wagering game is dependent, at least in part, upon which one or ones of the channels of the spacer are transmitting light emitted by the second light-emitting layer through light emitted by the first light-emitting layer.

* * * * *